B. P. ROMAIN.
CAPACITY METER.
APPLICATION FILED JAN. 2, 1915.

1,217,827.

Patented Feb. 27, 1917.
2 SHEETS—SHEET 1.

Witnesses:
L. L. Browning
Roxie Dobson

Inventor
Burchard P. Romain
By his Attorney
Edward C. Davidson

UNITED STATES PATENT OFFICE.

BURCHARD P. ROMAIN, OF SOUTH ORANGE, NEW JERSEY, ASSIGNOR TO WESTON ELECTRICAL INSTRUMENT COMPANY, OF NEWARK, NEW JERSEY, A CORPORATION OF NEW JERSEY.

CAPACITY-METER.

1,217,827.　　　　Specification of Letters Patent.　　Patented Feb. 27, 1917.

Application filed January 2, 1915. Serial No. 49.

*To all whom it may concern:*

Be it known that I, BURCHARD P. ROMAIN, a citizen of the United States of America, residing in South Orange, county of Essex, State of New Jersey, have invented certain new and useful Improvements in Capacity-Meters, of which the following is a specification.

This invention relates to a direct reading capacity meter adapted to correctly measure capacities in standard units of measurement, by the movement of a pointer on a scale.

The principle utilized in carrying out the present invention depends upon the reactance afforded by capacity in a circuit to a periodic current. That is to say, in carrying out the invention the capacity to be measured is balanced against a standard capacity by determining the relative effect of their respective reactances. In other words, the reactances are measured with respect to one another, from which it is known that the capacities are in inverse ratio to such reactances. Consideration of the mathematical formulas governing reactance of condensers will show that their capacities vary in this way.

In the best constructions embodying the invention a standard capacity and a capacity to be measured are located in branch circuits both forming separate coils or windings on a movable element in the instrument, within a magnetic field. Also, it is important according to the present invention, that the magnetic field be such as to always have a strength and direction of lines of force substantially in step with the periodic currents in the movable element. The movable element in the best constructions embodying the invention, is freely poised and thereby capable of taking any position freely. The movable system is, however, constrained to have a certain position by virtue of the electromagnetic action, normally coming to zero position, when zero capacity or in other words an open circuit is present across the terminals where the capacity to be measured will ordinarily be located. This affords a test for the zero position of the pointer. When, however, any measurable capacity is present across said terminals, a magnetic force of varying magnitude, depending upon the amount of the capacity so inserted, is set up tending to move the movable system and the pointer varying distances, which may be nearly or more than ninety degrees.

It will also be seen that according to the present invention, means are provided for having the scale graduations reasonably uniform without being congested too closely together at any part of the scale. The various sources of error which might produce an incorrect reading, are furthermore overcome as will hereafter be pointed out. In this respect certain modifications are possible. It is particularly desirable to have the instrument independent of wave form and changes of frequency and voltage in the periodic current supply, within wide limits and this is also accomplished.

In the drawings: Figure 1 is a view of a simple form of capacity meter embodying the invention so as to illustrate certain main features thereof.

Constructions embodying the invention will include a movable coil which is poised in a magnetic field, when the instrument is in use.

Figure 1:
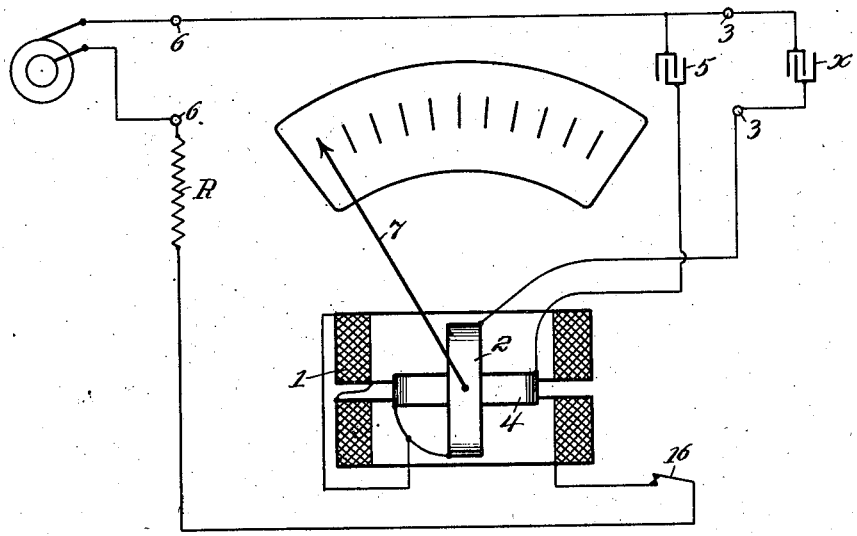

As illustrated in the drawings, the magnetic field is established by the same source of current as supplies the movable coil. In Fig. 1 the windings 1 of the magnetic field are in series with such movable coil 2, while in Fig. 2 the windings of the field and movable coil are in multiple circuit. Fig. 1 is the simpler arrangement, and may therefore be first considered, its simplicity arising particularly from the fact that the currents necessarily pulsate together in both field and movable coil since the two are in series with one another. In other words, the currents and also the magnetic forces are in phase or in step. Both will be a maximum at the same instant and will be zero at the same instant. Thus the tendency of the coil to turn will be due to both the strength of the field and the magnetic strength of the coil, varying as the product of the magnetic forces. The tendency of the coil to turn will, however, depend upon its position, and will be a maximum as illustrated in Fig. 1, where the position of its axis is directly across the axis of the magnetic field. The circuit of this coil or winding includes terminals 3 across which is placed the capacity X to be measured. It is here to be noted, as an important feature for consideration in the carrying out of this invention, that the resistance and inductive reactance of this coil 2 is very small and practically negligible with respect to the capacity reactance which will be measured. The importance of this will later be pointed out.

A second coil 4 also forms part of the movable element, and in the construction of Fig. 1 this second coil is fixed on the movable element, so that its axis is at right angles to the first mentioned coil. This second coil forms part of a divided circuit with respect to the first coil, both being branches of the series circuit through the field coil. This second coil 4 has permanently in circuit therewith a capacity 5 which forms part of the instrument. This capacity, like that to be measured, has a reactance which is large in proportion to the resistance and inductive reactance of the movable coils.

6 denotes terminals adapted to be connected to any available source of alternating currents, such as an electric lighting circuit. A resistance R may be further included in this circuit to prevent excessive currents in the instrument.

It will be understood that the coil 4 may have magnetic forces tending to turn it by the same principles which have already been considered with the coil 2. Since the coil 4 has its axis at right angles to that of the coil 2 in Fig. 1, the coil 4 will exert its maximum turning torque per unit of current, when the coil 2 has its minimum or zero turning torque, per unit of current and vice versa. In the position of Fig. 1 the coil 4 in circuit with the fixed or known capacity 5 is exerting no turning torque. Any displacement of the movable element will however, increase the turning torque of the coil 4 and diminish that of the coil 2, until the turning moments are equal and opposite, whereupon the movable system will come to rest. Its position, indicated by the pointer 7 on the scale may therefore be calibrated to measure the relative magnetic effects of the two movable coils, which are brought in a condition to balance one another at such particular position of the movable system. If it be assumed that the currents in the respective coils 2 and 4 are in phase or in step with one another, their magnetic effects tending to turn the coils will be proportionate to such currents in the coils. This is obviously true in the case of Fig. 1 where the magnetic force of the field is also necessarily in step under such circumstances. The well known formula governing the phase of a current in a circuit including a capacity which has very large reactance in proportion to the resistance of such circuit, shows that there is substantially a lead of 90 degrees under such circumstances. As this is the condition in both branches of the divided circuit including the coils 2 and 4, both branches will have their currents substantially 90 degrees ahead of their common impressed electromotive force, and are therefore substantially in step or in phase with one another, in compliance with the assumption just made. The formula just mentioned also indicates that under such particular circumstances as assumed, the current flowing is proportionate to the capacity of the circuit. Therefore, the two coils will have currents proportionate to the relation of the capacities 5 and X. In other words, under the conditions of the instrument of Fig. 1, as already described, the currents in the coils 2 and 4 will be substantially in step or in phase with one another and will have a ratio to one another the same as the ratio of the capacity X to the capacity 5, whatever the capacity X to be measured may be. Therefore, the position of the movable system, which indicates the ratio of the magnetic forces of the respective coils 2 and 4 and thereby, the ratio of their currents, may be calibrated to accurately show the relation of the unknown capacity to be measured to a known or unit capacity in the instrument, in other words, constituting a measure of the amount of the unknown capacity.

As the currents through the coils 2 and 4 are affected in substantially the same proportion by changes of frequency it follows that the ratio of the currents in these coils is virtually unaffected by such frequency changes. Since the position of the pointer depends upon this ratio, the indications of the instrument will be substantially independent of frequency over a considerable range. Similarly the accuracy of the measurement is unaffected by changes of wave form. As a practical matter the movable coils will of course have a slight finite resistance since it is impossible to make them with zero resistance. But as the resistance may be made very small, the instrument substantially complies with the conditions above described, furnishing a substantially accurate measure of the unkonwn capacity, regardless of wide variations in the frequency and wave form of the alternating current supply. The instrument is also independent of variations in the voltage of such current supply, since an increase in voltage will merely increase the currents in the respective coils of the movable system in the same ratio, whereby the ratio of their forces to one another is unchanged. The fact just mentioned that the two windings of the movable element will actually have a slight resistance, which cannot be wholly eliminated, will result in a very slight difference in phase, which may vary, depending upon the amount of the unknown capacity to be measured and the frequency. This fact makes it desirable to have the field current substantially in step or in phase with that of the movable element. This is true because the turning effect of the field on the movable system is proportionate to the cosine of the angle of phase difference between the field and the movable system, and if the phase difference between the field and the movable system is small, the cosine is substantially constant regardless of minor angular variations. Thus such slight differences of phase as the two coils of the movable system have with respect to one another by reason of small but finite resistances, will result in an inappreciable error in turning torque from the true ratio of the actual currents therein. In Fig. 1 this condition is complied with by the fact that the field is in series with the coils of the movable element.

Figure 2:
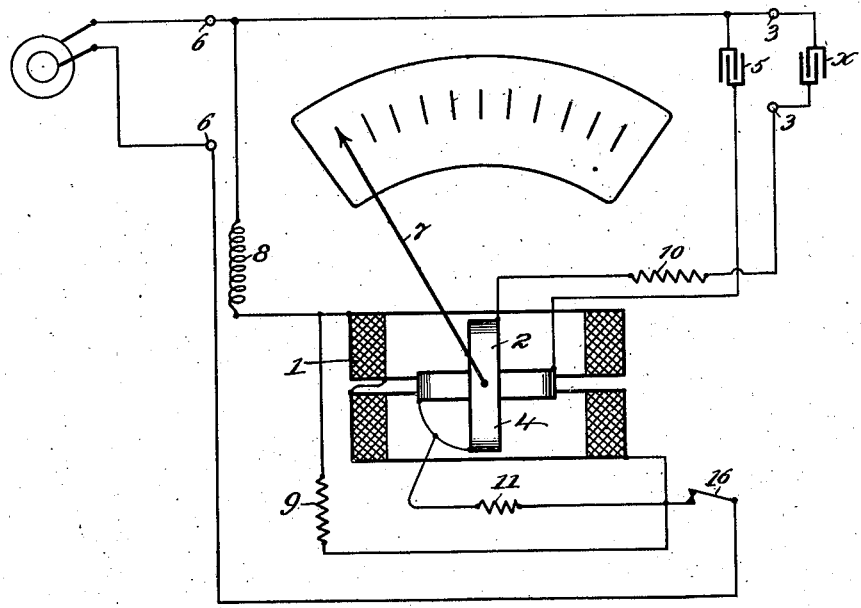
Fig. 2, is a similar view showing certain additions and modifications which are possible.

In the construction of Fig. 2, however, the field coil 1 is in a multiple circuit with the coils 2 and 4 of the movable element and therefore may be away from the phase thereof by a greater or less extent. This field may however, be brought into accurate or substantially accurate phase with the movable element by an inductance 8 in series with the field and a resistance 9 in parallel with the field. Consideration of known principles shows that this inductance and resistance can be so related to one another and to the field coil as to make the field current lag 90 degrees behind the E. M. F. As the movable coils 2 and 4 have currents 90 degrees in advance of the impressed E. M. F., under the conditions above described, it follows that the field and the movable coils are in phase or in step in effect. The difference between being directly in phase and 180 degrees apart is of course the same in effect as reversing the connections of the field winding. It will of course be understood that the connections are so made as to give the field flux in the proper direction to turn the movable element properly on the scale.

Therefore the instrument of Fig. 2 will have the same qualities of action and operation as that of Fig. 1.

As a means for protecting the coils against burning out, which otherwise might occur by placing a defective or short circuited capacity across the measuring terminals, a resistance 10 may be put in series with the movable coil 2. Or in place of this a resistance 11 may be put in the common circuit from which both movable coils divide. If desired both the resistances 10 and 11 may be inserted. This tends to increase the errors due to change of frequency and wave form, but not necessarily to a sufficient degree to be objectionable for commercial measurements.

Figure 3:
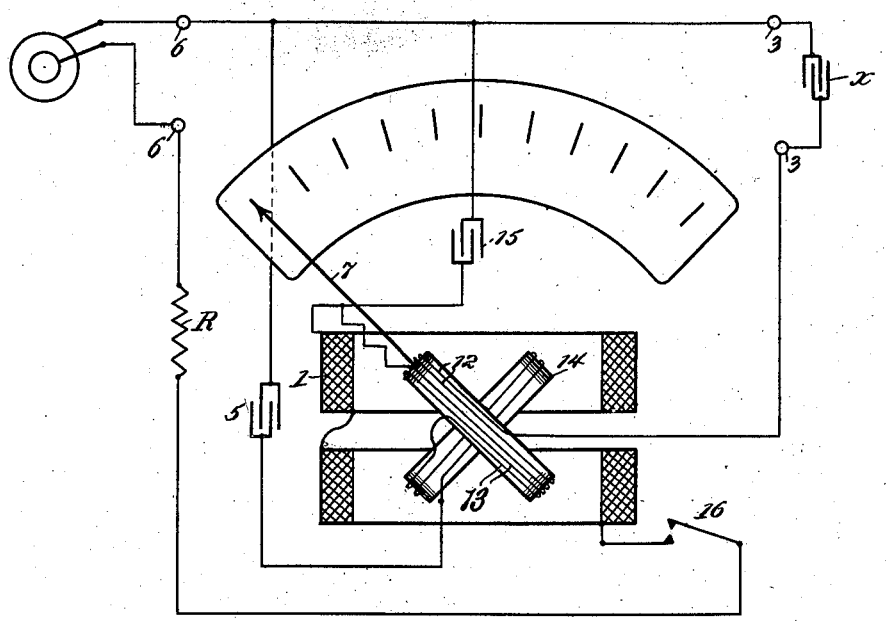
Fig. 3, is still a third view, of similar character, showing still further additions and modifications which may be made in the carrying out of the invention.

It will be evident that the forms of instrument thus far described have certain characteristics in common, and these common characteristics are further possessed by the form of instrument shown in Fig. 3, which however has certain additional features, by reason of which it possesses an improved action or mode of operation over the other forms. It has been taken up subsequently to the description of the first forms, however, on account of the fact that it generally possesses the features already described, but has additional features which are best understood after the simpler forms, involving some of the main principles, are thoroughly understood.

It will be seen that in either of the instruments of Figs. 1 and 2, the pointer has an extreme theoretical movement of only 90 degrees corresponding to the range between zero and infinity in the capacity to be measured. But the last 45 degrees of movement will be much less advantageous for the purposes of accurate measurement than the first 45 degrees, and the scale is greatly contracted toward its upper end when a pointer deflection approaching 90 degrees is sought.

In accordance with the construction of Fig. 3 the movable element has the same outline or form, mechanically considered, but it is so wound as to get the effect of two coils with their axes at a different angle than 90 degrees. For example the coils may be made to have the same effect as if their axes were 45 degrees apart, or 135 degrees, or any other desired angle. This construction is only illustrated in Fig. 3. For convenience the field winding 1 is here shown in series with movable elements, similar to the arrangement of Fig. 1, but it is evident that the form of field connection of Fig. 2 is equally applicable. The circuit which supplies the current to the movable element divides into two branches 12, 13 on one of the coils or spools of the movable element. In other words one of the coils has two divisions which may be of the same number of turns. The other coil 14, has a position 90 degrees apart from the first and has its winding in series with one of the windings 13 on the first movable coil, and as shown, has as many turns as such winding 13 on the first coil. The pair of windings 13, 14, thus connected in series with one another, are further joined to one of the capacities, as shown to the capacity 5 forming a fixed part of the instrument, and also to the field coil 1, and to the condenser 15, if provided. The other winding 12 is connected to one of the terminals 3, 3 across which the unknown capacity X to be measured will be connected, being also connected to the field coil 1 and to the condenser 15. Since windings 13 and 14 are always working together, as part of the same circuit, it is evident that their combined effect produces a resultant field on an axis half way between their separate individual axes, in other words at 45° thereto, and also at 45° (or 135°) from the axis of the other coil 12. The total electrical effect is the same as that of two simply wound coils or spools having their axes mechanically arranged at 45 degrees or 135 degrees from one another. It will be evident under these circumstances that the pointer has a possible movement of 135 degrees instead of 90 degrees, between zero and infinity capacities to be measured. At least 90 degrees of this movement corresponds to a good readable scale, that is, to a scale having reasonably uniform divisions not too much congested at any point. While the condition mentioned, namely, 135 degrees, is a desirable practical amount in an instrument of this sort, it is evident that this value may be increased or diminished by altering the number of turns in the windings 12, 13, 14 with respect to one another. Or the coils may have a position other than 90 degrees apart, as a matter of mechanical construction.

In some cases it is desirable to have a strong field in order to get the required torque in the instrument while maintaining the other qualities already described. This can be accomplished by an additional condenser 15 in parallel with the circuits of the movable system. This condenser 15 is shown in Fig. 3 of the drawings, and is permanently included in the circuits, where it is employed at all. It having already been pointed out that the resistance of the movable system, in both branches thereof is negligible or substantially negligible with relation to the reactances therein, it follows that their phase will not only be substantially alike, but will also be substantially like that of this additional condenser 15. Therefore the phase relation of the coils with respect to one another or with respect to the field is not altered by the inclusion of the new condenser 15, and the conditions already pointed out are not disturbed, the only effect being an increase of the current through the field, resulting in greater turning force or torque as required.

Of course the condenser may be simply omitted where the other capacities are sufficient to give a strong enough field, in which case the field coil connections will be the simple series arrangement of Fig. 1.

In all forms of the instrument a convenient key 16 may be inserted in the circuits at a suitable point to conveniently operate the instrument during a test. It will further be understood that the current is led into the movable system through the usual spiral or other delicate filaments which are so adjusted and related to one another, according to known principles, as to influence the position of the pointer 7 as little as possible, permitting a substantially free movement thereof in all positions.

By suitably mounting the pointer with reference to the movable system the positions of the standard or known condenser and the unknown condenser to be measured may be reversed with reference to the circuits of the movable system.

I claim:

1. A capacity meter comprising a field coil, a movable element having a substantially free or unimpeded movement in any position thereof, a pair of windings thereon, a fixed or known capacity forming part of the circuit of one winding, and terminals across which a capacity to be measured can be inserted forming part of the circuit of the other winding, said windings having a substantially negligible resistance and inductive reactance in relation to reactance of said capacities.

2. A capacity meter comprising a field coil, a movable element having a substantially free or unimpeded movement in any position thereof, windings thereon having the effect of two separate coils, a fixed or known capacity forming part of the circuit of one such coil, and terminals across which a capacity to be measured can be inserted forming part of the circuit of the other such coil, both such coils having a substantially negligible resistance and inductive reactance in relation to reactance of said capacities.

3. A capacity meter comprising a field coil, a movable element, a winding thereon divided into two parts, a fixed or known capacity in the circuit of one of said such parts, and terminals across which a capacity to be measured can be inserted forming part of the circuit of the other such part, both parts having a substantially negligible resistance and inductive reactance in relation to reactance of said capacities.

4. A capacity meter comprising a field coil, a movable element, coils, one with a winding thereon having two parts, a fixed or known capacity forming with the other of said coils a portion of the circuit of one such part, a condenser in multiple with this circuit and terminals across which a capacity to be measured can be inserted in the circuit of the other such part, the movable element winding having a substantially negligible resistance and inductive reactance in relation to reactance of said capacities.

5. A capacity meter comprising a field coil, a movable element having a substantially free or unimpeded movement in any position thereof, a pair of windings thereon having their magnetic axes at an angle to one another, a fixed or known capacity forming part of the circuit of one winding, and terminals across which a capacity to be measured can be inserted forming part of the circuit of the second winding, said windings having a substantially negligible resistance and inductive reactance in relation to reactance of said capacities.

6. A capacity meter comprising a field coil, a movable element having a substantially free or unimpeded movement in any position thereof, windings thereon, producing two coils with their magnetic axes at any chosen angle to one another, a fixed or known capacity forming part of the circuit of one such coil, and terminals across which a capacity to be measured can be inserted forming part of the circuit of the other such coil, said coils having a substantially negligible resistance and inductive reactance in relation to reactance of said capacities.

7. A capacity meter comprising a field coil, a movable element having a substantially free or unimpeded movement in any position thereof, a pair of windings thereon, said field coil being connected and arranged to be in phase or in step with the current in said windings, a fixed or known capacity forming part of the circuit of one winding, and terminals across which a capacity to be measured can be inserted forming part of the circuit of the other winding, said windings having a substantially negligible resistance and inductive reactance in relation to reactance of said capacities.

8. A capacity meter comprising a field coil, a movable element having a substantially free or unimpeded movement in any position thereof, a pair of windings thereon, means for maintaining the phase of the current the same in the field coil and in the windings, a fixed or known capacity forming part of the circuit of one winding, and terminals across which a capacity to be measured can be inserted forming part of the circuit of the other winding, said windings having a substantially negligible resistance and inductive reactance in relation to reactance of said capacities.

9. A capacity meter comprising a field coil, a movable element, a winding having two parts thereon, a fixed or known capacity in circuit with one of such parts, terminals across which a capacity to be measured can be inserted in circuit with the other such part, and a protective resistance also in the circuit including said terminals, said winding and said protective resistance having a substantially negligible resistance and inductive reactance in relation to reactance of said capacities.

10. A capacity meter comprising a field coil, a movable element, a winding thereon having two parts, a fixed or known capacity in the circuit of one such part, terminals across which a capacity to be measured can be inserted in the circuit of the other such part, and a protective resistance in circuit with both such parts, said winding and said protective resistance having a substantially negligible resistance and inductive reactance in relation to reactance of said capacities.

11. A capacity meter comprising a field coil, a movable element, a winding thereon having two parts, a fixed or known capacity in circuit with one of such parts, terminals across which a capacity to be measured can be inserted in circuit with the other such part, a protective resistance also in such latter part, an additional protective resistance in circuit with both such parts, said winding and said protective resistances having a substantially negligible resistance and inductive reactance in relation to reactance of said capacities.

12. A capacity meter comprising a field coil, a movable element, a winding thereon having two parts, a fixed or known capacity in circuit with one of such parts, terminals across which a capacity to be measured can be inserted in circuit with the other of such parts, said winding having a substantially negligible resistance and inductive reactance in relation to reactance of said capacities, and a key for closing the circuits of the instrument during a test.

13. A capacity meter comprising a field coil, a movable element having a substantially free or unimpeded movement in any position thereof, coils thereon affording windings, one winding 12 with a magnetic axis more than 90 degrees apart from the magnetic axis produced by the remaining windings 13, 14, a fixed or known capacity forming part of the circuit of one such coil, and terminals across which a capacity to be measured can be inserted forming part of the circuit of the other such coil, said windings having a substantially negligible resistance and inductive reactance in relation to the reactance of said capacities, whereby a deflection of the movable element in excess of 90 degrees is available for selection on the readable scale.

14. A capacity meter comprising a field coil, a movable element having a substantially free or unimpeded movement in any position thereof, coils thereon affording windings, one winding 12 with a magnetic axis 135 degrees from the magnetic axis produced by the remaining windings 13, 14, a fixed or known capacity forming part of the circuit of one such coil, and terminals across which a capacity to be measured can be inserted forming part of the circuit of the other such coil, said windings having a substantially negligible resistance and inductive reactance in relation to the reactance of said capacities, whereby a deflection of 135 degrees of the movable element is available for selection on the readable scale.

In testimony whereof, I have hereunto subscribed my name.

BURCHARD P. ROMAIN.

Witnesses:
 EDW. T. WESTON,
 JOS. A. DONIAN.